(12) United States Patent
Eberlein

(10) Patent No.: US 8,382,197 B2
(45) Date of Patent: Feb. 26, 2013

(54) COMPOSITE MADE OF TWO STEEL PLATES

(75) Inventor: Wolfgang Eberlein, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 523 days.

(21) Appl. No.: 12/518,137

(22) PCT Filed: Dec. 7, 2007

(86) PCT No.: PCT/EP2007/063562
§ 371 (c)(1),
(2), (4) Date: Jan. 13, 2010

(87) PCT Pub. No.: WO2008/068346
PCT Pub. Date: Jun. 12, 2008

(65) Prior Publication Data
US 2010/0117400 A1    May 13, 2010

(30) Foreign Application Priority Data
Dec. 8, 2006   (DE) .................... 10 2006 057 864

(51) Int. Cl.
*B62D 25/04* (2006.01)
(52) U.S. Cl. ................. 296/193.06; 296/203.03
(58) Field of Classification Search ............ 296/187.12, 296/193.06, 203.01–203.04, 205, 29, 30; 29/897.2
See application file for complete search history.

(56) References Cited

U.S. PATENT DOCUMENTS

| 5,096,254 | A | * | 3/1992 | Sparke | 296/193.06 |
| 6,059,899 | A | * | 5/2000 | Shibata et al. | 148/320 |
| 6,896,320 | B2 | * | 5/2005 | Kropfeld | 296/203.01 |
| 7,052,078 | B2 | * | 5/2006 | Akasaka | 296/191 |
| 7,062,853 | B2 | * | 6/2006 | Reed et al. | 29/897.2 |

(Continued)

FOREIGN PATENT DOCUMENTS

| DE | 10305725 B3 | 4/2004 |
| DE | 10338025 B3 | 4/2005 |

(Continued)

OTHER PUBLICATIONS

International Search Report dated May 21, 2008 for International Application No. PCT/EP2007/063562.

(Continued)

*Primary Examiner* — Glenn Dayoan
*Assistant Examiner* — Gregory Blankenship
(74) *Attorney, Agent, or Firm* — Ingrassia Fisher & Lorenz, P.C.

(57) ABSTRACT

A composite is provided that includes, but is not limited to a first steel plate, which is welded via a weld seam to a second steel plate, in which the two steel plates and the weld seam bonding them are hardened and the composite has a broadening in the area of the weld seam. Furthermore, a B-column is provided for a motor vehicle body that includes, but is not limited to a reinforcement B-column, the reinforcement B-column including, but not limited to a first steel plate, which is welded via a weld seam to a second steel plate, and the two steel plates include, but are not limited to a heat-treated steel and are hardened like the weld seam bonding them, and the reinforcement B-column has a broadening in the area of the weld seam.

15 Claims, 2 Drawing Sheets

U.S. PATENT DOCUMENTS

| | | | |
|---|---|---|---|
| 7,077,920 B2 | 7/2006 | Gehringhoff | |
| 7,152,914 B2 | 12/2006 | Dingman et al. | |
| 7,455,340 B2 | 11/2008 | Grüneklee et al. | |
| 7,914,068 B2 * | 3/2011 | Mizohata | 296/193.06 |
| 8,118,355 B2 * | 2/2012 | Tamura et al. | 296/209 |
| 2001/0033096 A1 * | 10/2001 | Hanyu | 296/203.01 |
| 2003/0137162 A1 * | 7/2003 | Kropfeld | 296/203.01 |
| 2004/0201253 A1 * | 10/2004 | Kitagawa et al. | 296/187.03 |
| 2008/0121776 A1 * | 5/2008 | Houston et al. | 248/515 |
| 2008/0196800 A1 | 8/2008 | Beenken et al. | |
| 2008/0315628 A1 * | 12/2008 | Obayashi | 296/193.06 |
| 2010/0117400 A1 * | 5/2010 | Eberlein | 296/193.01 |
| 2010/0259072 A1 * | 10/2010 | Mizohata | 296/203.03 |
| 2011/0233966 A1 * | 9/2011 | Pellmann et al. | 296/193.06 |
| 2011/0233970 A1 * | 9/2011 | Nagai et al. | 296/203.03 |
| 2011/0266836 A1 * | 11/2011 | Heo et al. | 296/193.06 |

FOREIGN PATENT DOCUMENTS

| | | |
|---|---|---|
| DE | 102004005568 A1 | 9/2005 |
| DE | 102004032599 A1 | 2/2006 |
| DE | 102004040569 A1 | 3/2006 |
| DE | 102004054795 A1 | 5/2006 |
| DE | 102005025026 B3 | 10/2006 |
| DE | 102006012673 A1 | 10/2006 |
| DE | 102005017982 A1 | 11/2006 |
| EP | 0713746 A1 | 5/1996 |
| EP | 0816520 A2 | 1/1998 |
| SU | 835678 A1 | 6/1981 |

OTHER PUBLICATIONS

Russian Patent Office, Russian Office Action dated Dec. 19, 2011 for RU Application No. 2009126142.02.

* cited by examiner

COMPOSITE MADE OF TWO STEEL PLATES

CROSS-REFERENCE TO RELATED APPLICATIONS

This application is a U.S. National-Stage entry under 35 U.S.C. §371 based on International Application No. PCT/EP2007/063562, filed Dec. 7, 2007, which was published under PCT Article 21(2) and claims priority to German Application No. 102006057864.3, filed Dec. 8, 2006, which are all hereby incorporated in their entirety by reference.

TECHNICAL FIELD

The invention relates to a composite made of at least two steel plates, a B-column for a motor vehicle body which comprises a composite of this type, and a method for the production thereof.

BACKGROUND

In the production of motor vehicle bodies, plates made of hardened steel are frequently used, which must be welded to one another. For this purpose, the plates may be joined using lasers to form tailored welded blanks The hardened steels are used, inter alia, for the purpose of meeting the increasingly strict requirements which have been set for the protection of the vehicle occupants. For this purpose, in the particular countries in which the motor vehicle is to be approved, there are standardized impact tests which a vehicle model must withstand before approval, in order to be approved. In Europe, for example, these are the tests according to Euro-NCAP (European New Car Assessment Program).

However, the goal in vehicle construction is not only to use stronger or harder steels, but rather also to improve their welded bonds, because, as tensile experiments in the laboratory often show, weld seams represent the weakest point in the composite.

If one transfers this finding to vehicle body construction, the goal is to improve the strength of the weld seams in vehicle body parts which are welded to one another.

It is at least one object of one embodiment of the invention to provide a composite made of at least two high-strength steel plates, which are welded to one another, and/or a steel plate blank, whose weld seams have a higher strength. The object of a further embodiment of the invention comprises providing a B-column, whose weld seams have a higher strength. In addition, other objects, desirable features, and characteristics will become apparent from the subsequent summary and detailed description, and the appended claims, taken in conjunction with the accompanying drawings and this background.

SUMMARY

A first aspect of the invention relates to a composite, comprising a first steel plate, which is welded via a weld seam to a second steel plate. The two steel plates comprise a heat-treated steel and are hardened like the weld seam which bonds them. The composite has a broadening in the area of the weld seam.

The cited composite represents a tailored welded blank made of at least two plates made of a heat-treated steel. The unit made of the two steel plates including weld seam is hardened. This means that not only the steel plates, but rather also the weld seam itself is hardened. In practice, this is performed in that the non-hardened steel plates are welded together and then subjected to hardening as a unit. The tensile strength of the steel plates to be set by the hardening is at least about 800 MPa.

Furthermore, the composite has a broadening in the area of the weld seam. The tension on the weld seam is reduced by the broadening in the event of high tensile and bending strain, and it is additionally ensured that even in the event of extremely high mechanical strains, the blank material does not tear in the weld seam, but rather in the basic material. This allows the use of a composite of this type in vehicle body construction. A broadening of the steel blank in the area of the weld seam is to be performed at least for the area of the heat influence zone. As a function of the weld seam geometry, a broadening may be selected in an area of at least 2 mm above and below the weld seam edge. The broadening may be a rectangular protrusion or may be rounded.

In the composite described above, the two steel plates are high-strength plates after the hardening, i.e., steel plates having a tensile strength of at least about 800 MPa. In an alternative embodiment, the steel plates provide the property of high tensile strength of at least about 800 MPa already as cold-rolled or hot-rolled steels and thus do not have to be hardened further. Accordingly, a further aspect of the invention relates to a composite, comprising a first steel plate, which is welded via a weld seam to a second steel plate, the two steel plates comprising cold-rolled or hot-rolled steel having a tensile strength of at least about 800 MPa. The composite has a broadening in the area of the weld seam.

It is suspected that the following reason is responsible for the fact that a steel plate blank of the type described above has a greater mechanical carrying capacity and does not tear in the weld seam: upon welding of two steel plates, decarbonization may occur in the molten steel material. The welding may be laser welding, MIG or MAG welding, or MIG or MAG soldering. The term "weld seam" in the scope of this invention thus also comprises the term "soldering seam".

The decarbonization may be counteracted by protective measures, such as the use of a protective gas or the optimization of welding parameters, but if decarbonization occurs nonetheless, it is compensated for by the broadening of the steel plate blank. Due to the broadening, the tension on and/or in the weld seam is reduced and flowing of the base material along the weld seam and/or in the weld seam are avoided in case of strain. This has the result that in the event of an overload, the weld seam is not the weakest point of the composite. The behavior of the composite in a case of this type may thus be more easily predicted and optimized. A component which comprises the composite described above thus offers an increased degree of strength in a motor vehicle body.

In addition, upon hardening of the composite, cooling problems may occur at the weld seam. The cause is that the cooling tool is sometimes not adapted accurately to the millimeter and thus a small air gap forms in the weld seam area. In this case, the quenching does not occur uniformly enough, whereby the weld seam area is not sufficiently hardened. The broadening of the weld seam area compensates for an unsatisfactory hardening of the weld seam material of this type. This allows the manufacturing tolerances in regard to the strength and/or hardening values to be selected more generously in the area of the weld seam, which results in a more cost-effective production of the composite with identical usage properties.

In a second embodiment, the two steel plates of the composite each comprise a material whose martensite and/or bainite proportion in the transverse grind is greater than about 50%. The composite may comprise two heat-treated steel plates which are welded to one another, which were subsequently hardened, or it may comprise two welded-together cold-rolled or hot-rolled (and nonhardened) steel plates of the above-mentioned tensile strength.

To determine the bainite and/or martensite content of the second plate, a piece is taken and embedded, ground, and etched so that the cross-section of the second plate is viewed during the determination. Because of the different etching behaviors of the individual microstructure components, the individual microstructure components are recognized. The individual microstructure components are three-dimensional, martensite and bainite appearing needle-shaped. The area proportion in the grind is determined via software by differentiating grayscale tones. A light-microscopy assignment of proportions of the grind image to bainite or martensite it is sometimes not possible.

According to the attempted explanation provided above for the behavior of the composite in the event of extreme mechanical strain in the area of the weld seam, the problem results of the weld seam which does not have sufficient mechanical carrying capacity in the event of hardened steels made of a heat-treated steel, on the one hand. The heat-treated steel may be, for example, 22MnB5 or 19MnB4. On the other hand, the steels may comprise a cold-rolled or hot-rolled steel and, for example, a dual-phase steel, a complex-phase steel, a TRIP steel, or a martensitic steel here.

In a third embodiment, the two steel plates which are bonded to one another via the weld seam have different thicknesses. In the event of a thickness difference of the two steel plates, in the prior art, a tension concentration, and thus a lower mechanical carrying capacity, occurs on the weld seam. This is all the more true the greater the thickness difference. As noted above, the maximum tension is displaced away from the weld seam by the broadening of the composite on the weld seam, so that in the event of a thickness difference of the steel plates, using the embodiments of the invention described above, the composite has a higher strength in the area of the weld seam.

According to a further embodiment, the two steel plates have a thickness difference of at least about 0.5 mm. In experiments using 22MnB5 plates, for example, good results were achieved employing the broadening, for example, using the plate thickness combination about 2.0 mm/1.3 mm or a plate thickness difference of about 0.7 mm. Slight improvements already resulted with the plate thickness combination of about 1.7 mm/2.0 mm, however, i.e., at a plate thickness difference of only about 0.3 mm.

As described above, the composite has a broadening in the area of the weld seam. If the composite is one having oblong shape and a weld seam perpendicular to the longitudinal direction (=horizontal direction), according to a further embodiment, this means that the width of the composite is increased in the area of the weld seam.

In a further embodiment, the composite, such as the composite of the last paragraph, is the reinforcement of a vertical strut of a motor vehicle, such as a passenger automobile. In such a case, the reinforcement may be manufactured from multiple plates of different thicknesses in relation to the vertical axis, the oblong weld seams running horizontally. The reinforcement, such as the reinforcement B-column, is then broadened in the area of the weld seams, in order to ensure an increased tensile strength for the case of a side impact and, in addition, increase the security of the vehicle occupants.

Accordingly, a third aspect of the invention comprises the provision of a B-column for a motor vehicle body, such as the vehicle body of a passenger automobile. It comprises a reinforcement B-column, which comprises a first steel plate, which is welded via a weld seam to a second steel plate. The two steel plates comprise a heat-treated steel and are hardened like the weld seam which connects them. The reinforcement B-column has a broadening in the area of the weld seam.

A fourth aspect of the invention also relates to the provision of a B-column for a motor vehicle body. It comprises a reinforcement B-column, the reinforcement B-column comprising a first steel plate, which is welded via a weld seam to a second steel plate. The two steel plates comprise a cold-rolled or hot-rolled steel having a tensile strength of at least 800 MPa. The reinforcement B-column has a broadening in the area of the weld seam.

In the B-column of the last paragraph or the composite corresponding thereto, as described above, it may be provided that the first steel plate and the second steel plate have the same plate thickness with different tensile strengths. In this case, a reinforcement B-column may be produced from a tailored welded steel plate blank, which causes less waste and/or material cutting during the production and simultaneously has the required strength in different areas. Thus, for example, the lowermost part of the reinforcement B-column may have a lower strength, so that it may be deformed inward in the event of a side impact, but a higher strength of the reinforcement B-column reliably protects the vehicle occupants in the security-critical middle area. The equal plate thicknesses of the steel plates avoid a tension concentration on the weld seam in case of strain for this purpose.

If the first and the second steel plates have an unequal plate thickness with differing tensile strength, for example, DP 800/TRIP 1000 come into consideration as the material combination. If the same strength is desired, the combination DP 800/DP 800, or DP 800/TRIP 800 may be selected.

Corresponding to the above embodiments, in a further embodiment, the material of the two steel plates of the B-column comprises a material whose martensite and/or bainite proportion in the transverse grind is greater than about 50% in each case. For this purpose, the two steel plates may have different thicknesses, e.g., a plate thickness difference of at least about 0.5 mm.

The fifth aspect of the invention relates to the production of an embodiment of the above-mentioned composite from at least two steel plates and/or an embodiment of the above-mentioned B-column. The method comprises a first step of connecting two plates made of a heat-treated steel using a weld seam, a second step of annealing and hot shaping the steel plate blank resulting in the first step, and a third step comprises quenching the steel plate blank, during the first step, which optionally also comprises a step of cutting the steel plate blank to size, and/or during a following step of cutting the hardened steel plate blank to size, a broadening resulting in the area of the weld seam.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding summary and background or the following detailed description.

Figure 1:
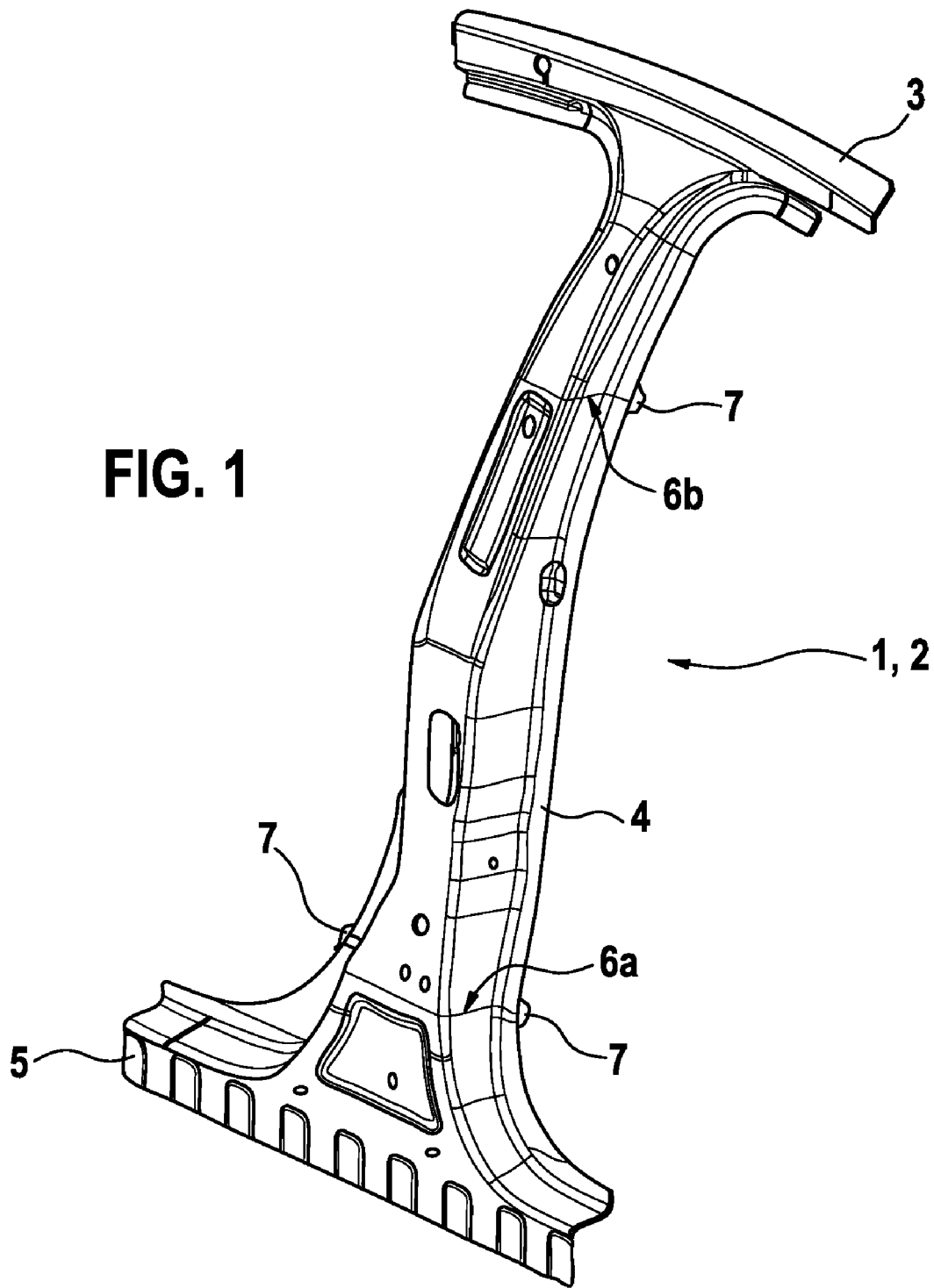
FIG. 1 shows the B-column of a passenger automobile.

In the figures, which generally identify identical objects using identical reference numerals, FIG. 1 shows a composite 1 in the form of a reinforcement B-column 2, which is welded together from a total of three steel plates 3, 4, and 5. If the reinforcing B-column 2 is situated vertically, a first weld seam 6a is located at a height of approximately 44 cm above the ground. The weld seam 6a runs horizontally and opens to the left and right into a broadening 7, which is shown exaggeratedly large. The lower steel plate 5 has a plate thickness of approximately 1.3 mm and the middle steel plate 4 has a plate thickness of approximately 2.0 mm. The middle steel plate 4 is welded at a height of approximately 107 cm above a horizontally running weld seam 6b to the upper steel plate 3. A broadening 7, which is not shown to scale, is also provided here. The upper steel plate 3 has a plate thickness of approximately 1.7 mm. The steel plates 3, 4, and 5 comprise the heat-treated steel 22MnB5.

Figure 2:
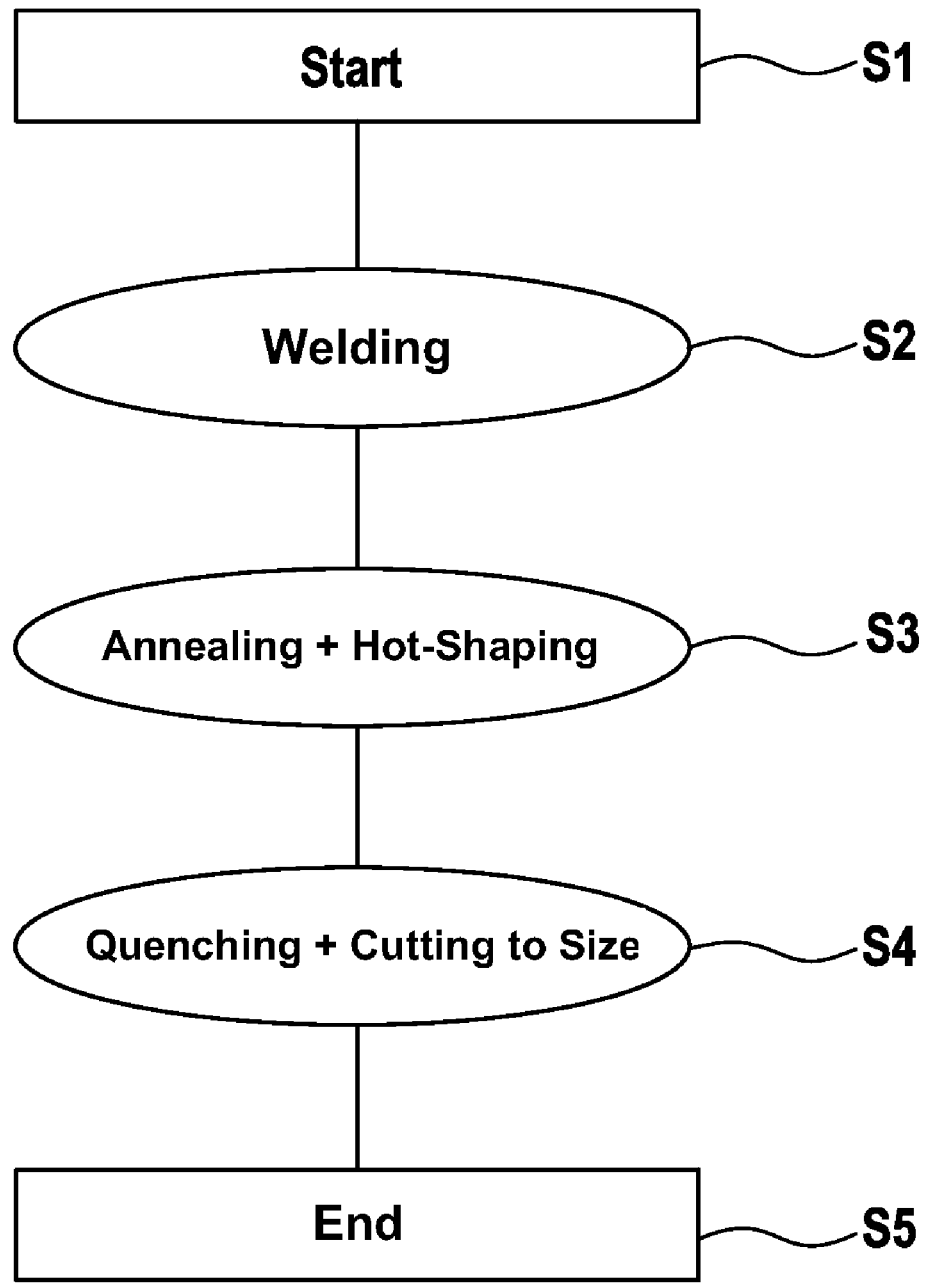
FIG. 2 shows a flow chart relating to the performance of the production method.

The production of this reinforcement B-column 2 and composites of this type in general is illustrated with the aid of the flowchart of FIG. 2. The method begins with step S1. In step S2, the non-hardened steel plates, in the present case the steel plates 3, 4, and 5, are welded to one another. In step S3, the welded-together unit is annealed and hot-shaped as a whole. Subsequently, in step S4, the quenching and cutting to size are performed with provision of a broadening 7 in the area of the weld seams 6a and 6b. The broadening 7 may also be provided in that the process of hot shaping is combined with suitable cutting to size. To provide a complete B-column, the reinforcement B-column 2 shown is placed between an inner side wall and an outer side wall (not shown).

If a side impact occurs on a motor vehicle, which comprises a reinforcement B-column 2 of this type, the strength in the area of the weld seams 6a and 6b is increased thereby. The weld seams 6a, 6b thus no longer represent the weakest point of the B-column 2, and the behavior of the B-column 2 may be optimized for the case of a side impact and, in addition, the protection of the vehicle occupants may be increased. In this way, for example, the conditions of the side impact test according to Euro-NCAP may also be fulfilled more easily.

Although concrete embodiments were described above, one skilled in the art will recognize that the description of these embodiments does not have the purpose of restricting the invention to the specified form. Rather, the invention is to comprise all modifications, equivalents, and alternatives which fall in the protective scope of the claimed invention. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment of the invention, it being understood that various changes may be made in the function and arrangement of elements described in an exemplary embodiment without departing from the scope as set forth in the appended claims and their legal equivalents.

The invention claimed is:

1. A composite, comprising:
    a first steel plate;
    a second steel plate welded to the first steel plate via a weld seam, wherein the first steel plate and the second steel plate comprise a heat-treated steel and the first steel plate, the second steel plate, and the weld seam are hardened together as a unit; and
    a broadening in an area of the weld seam such that the first steel plate at the broadening is wider than the first steel plate adjacent the broadening and the second steel plate at the broadening is wider than the second steel plate adjacent the broadening.

2. The composite of claim 1, wherein the first steel plate and the second steel plate comprise a rolled steel having a tensile strength of at least about 800 MPa.

3. The composite according to claim 1, wherein the two steel plates each comprise a material having at least one of a martensite or bainite component in a transverse grind that is greater than about 50%.

4. The composite according to claim 1, wherein the first steel plate has a first plate thickness and the second steel plate has a second plate thickness that is different from the first plate thickness.

5. The composite according to claim 1, wherein the first steel plate has a first tensile and the second steel plate has a second tensile strength that is different from the first tensile strength.

6. The composite according to claim 1, wherein the first steel plate and the second steel plate have a plate thickness difference of at least about 0.5 mm.

7. The composite according to claim 1, further comprising an oblong shape and a width is enlarged in the area of a weld seam.

8. The composite according to claim 1, further comprising a reinforcement of a vertical strut of a motor vehicle.

9. The composite according to claim 1, wherein the composite is a reinforcement of a B-column of a motor vehicle.

10. A reinforcement B-column for a B-column of a motor vehicle body, comprising:
    a first steel plate;
    a second steel plate welded via a weld seam to the first steel plate, wherein the first steel plate and the second steel plate comprise a heat-treated steel and the first steel plate, the second steel plate, and the weld seam are hardened together as a unit; and
    a broadening in the area of the weld seam such that the first steel plate at the broadening is wider than the first steel plate adjacent the broadening and the second steel plate at the broadening is wider than the second steel plate adjacent the broadening.

11. The reinforcement B-column of claim 10, wherein the first steel plate and the second steel plate comprise a rolled steel having a tensile strength of at least about 800 MPa.

12. The reinforcement B-column according to claim 10, wherein the first steel plate and the second steel plate each comprise a material having at least one of a martensite proportion or a bainite proportion in the transverse grind that is greater than about 50%.

13. The reinforcement B-column according to claim 10, wherein the first steel plate has a first thickness and the second steel plate has a second thickness that is different from the first thickness.

14. The reinforcement B-column according to claim 10, wherein the first steel plate and the second steel plate have a substantially similar plate thickness with a different tensile strength.

15. The reinforcement B-column according to claim 10, wherein the first steel plate and the second steel plate have a plate thickness difference of at least about 0.5 mm.

* * * * *